Sept. 17, 1929.  C. W. LAMBERT  1,728,619

LINEMAN'S KNIFE

Filed Jan. 7, 1927

Chandley William Lambert

Inventor.

Patented Sept. 17, 1929

1,728,619

UNITED STATES PATENT OFFICE

CHANDLEY WILLIAM LAMBERT, OF CLEVELAND, OHIO

LINEMAN'S KNIFE

Application filed January 7, 1927. Serial No. 159,699.

The invention has for its object to provide a new and useful article of manufacture in the form of a standard and efficient tool.

The invention consists, primarily, in the novel arrangements of openings in the tang, containing the plastic material of the handle, and the mode of embedding the loop into the handle.

Other novel features are the combination of the straight, unbeveled back of the blade, the blunt rounded point of the blade, and the generally rectangular cross-section of the handle.

Figure 1:
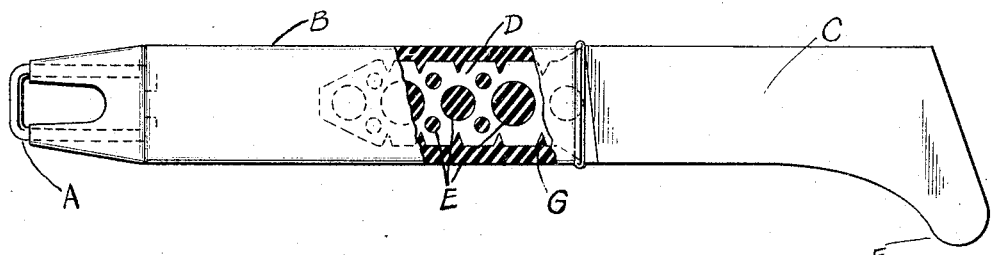
Figure 2:
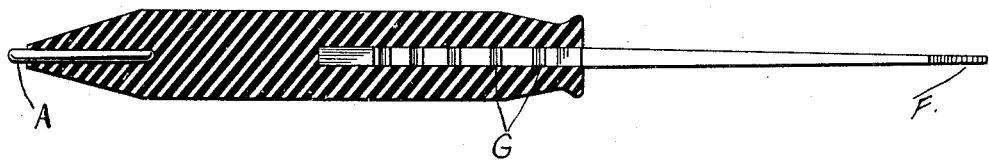
Figure 3:
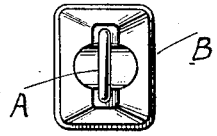
Figure 4:
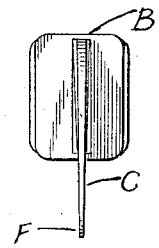

The particular form of the invention is clearly illustrated in the accompanying drawing, in which Fig. 1 is a side elevation of the lineman's knife, with part of the handle in section, embodying the principal features of the present invention. Fig. 2 is an edge elevation of the same with the handle in section. Fig. 3 is an end elevation looking toward the loop end of the handle. Fig. 4 is an end elevation looking toward the end of the blade.

The lineman's knife, as shown, consists of three essential parts; the loop, the plastic handle, and the blade.

The U-shaped loop "A," Figs. 1 and 2, is embedded into the plastic handle "B" so that only the bottom of the metal U is exposed. This minimizes the danger of short-circuiting adjacent wires. The plastic handle "B," Figs. 1, 2, and 3, has a long bevel or slope toward the loop "A," for facility in placing the knife on a snap on the lineman's belt, or in removing it from the same. The plastic handle "B", Figs. 3 and 4, has a generally rectangular cross-section. This makes it possible to control the blade at a particular angle to the wire from which the insulation is being cut.

The blade "C," Figs. 1 and 2, has a straight unbeveled back, the edges of which are used for scraping the wire.

The tang "D," of the blade, as shown in Fig. 1, has several openings, "E," containing the plastic material of the handle.

Notches, "G," in the edges of the tang, Figs. 1 and 2, also tend to give the plastic material of the handle, a firm grip on to the metallic tang.

Fig. 3 shows the loop "A," bridging the transverse opening through the beveled end of the handle "B."

The blade "C," has a blunt rounded point "F," Figs. 1 and 4, to prevent injury to the lineman.

Having thus described this invention, what I claim is new, useful, and novel, and desire to secure by Letters Patent, is:—

1. A lineman's knife comprising a handle of plastic material and a blade imbedded in one end thereof, the opposite end of the handle having converging faces, a U-shaped loop embedded in said converging faces symmetrically with the longitudinal center line of the handle, said loop being so placed and embedded between the converging faces of the handle that the loop is completely covered by the plastic material of the handle, except for the bottom central portion of the loop, which is exposed for the purpose of receiving the snap on the lineman's knife.

2. In a lineman's knife, comprising a one-piece handle having a blade embedded in one end of the handle and a U-shaped loop embedded in the opposite end, said loop and blade being insulated from each other, and in which no portion of the blade or loop is exposed on the surface of the handle intermediate the ends thereof.

CHANDLEY W. LAMBERT.